United States Patent Office 3,328,488
Patented June 27, 1967

3,328,488
GRAFTING VINYL MONOMERS ONTO A DIENE POLYMER BACKBONE WITH A DIVINYLBENZENE CROSS-LINKING AGENT PRESENT
Richard E. Delacretaz and Alvin Stein, Springfield, Mass., and Robert L. Walter, Ballwin, Mo., assignors to Monsanto Company, a corporation of Delaware
No Drawing. Filed Apr. 2, 1963, Ser. No. 269,876
9 Claims. (Cl. 260—880)

This invention relates to graft copolymers of the type prepared by polymerizing a monomer charge including a monovinylidene aromatic hydrocarbon in the presence of an aqueous dispersion of a rubbery diene polymer. More particularly, the invention relates to a modification of conventional procedures for preparing such graft copolymers to improve the physical properties of polyblends formed therefrom.

It is known that polyblends having valuable physical properties can be formed by blending a vinylidene resin with a graft copolymer prepared by polymerizing a monomer charge including a monovinylidene aromatic hydrocarbon in the presence of a preformed diene rubber. In the formation of polyblends of this type, use of a cross-linking agent in the preparation of the rubber substrate of the graft copolymer has been found to result in improving the surface gloss of the processed polyblends. However, this improvement has been accomplished by an undesirable loss in impact strength. The desirability of improving the surface gloss while minimizing the deleterious effect on impact strength is manifest.

An object of the invention is to provide novel graft copolymers of the type prepared by polymerizing a monomer charge including a monovinylidene aromatic hydrocarbon in the presence of an aqueous dispersion of a rubbery diene polymer.

Another object is to provide such graft copolymers capable of being blended with vinylidene resins to form polyblends having a good combination of physical properties.

A further object is to modify conventional procedures for preparing such graft copolymers so as to improve the physical properties of polyblends formed therefrom.

These and other objects are attained by polymerizing a monomer charge including a monovinylidene aromatic hydrocarbon in an aqueous dispersion of a preformed rubbery polymer prepared by polymerizing an aliphatic conjugated 1,3-diene, optionally together with copolymerizable monomers, in an aqueous emulsion under agitation conditions of a net horsepower of about 0.0001–0.0004 HP/gallon of reaction mixture in the presence of a cross-linking agent added to the system at a stage between about 30% and 60% conversion to polymer.

The following examples are given to illustrate the invention. Unless otherwise specified, quantities mentioned are quantities by weight.

EXAMPLE I (CONTROL)

Part A

Prepare a rubbery latex from the following polymerization recipe.

| Component: | Parts |
| --- | --- |
| Water | 265 |
| Butadiene | 90 |
| Styrene | 10 |
| Divinylbenzene | 0.625 |
| Sodium stearate | 6 |
| t-Dodecyl mercaptan | 0.4 |
| Potassium persulfate | 0.3 |

Charge the water and sodium stearate to a suitable, agitated reaction vessel. Boil to remove dissolved oxygen, and cool under nitrogen. Add the remaining components of the polymerization recipe. Heat at about 55° C. under agitation conditions of a net horsepower of about 0.0002 HP/gallon of reaction mixture to the stage of about 95% conversion to polymer.

Part B

Add about 0.15 part of potassium persulfate to the rubber latex of Part A. Then add about 50 parts of an 80:20 mixture of styrene and acrylonitrile with agitation over a period of about 3 hours, maintaining the temperature at 55° C. throughout the addition and for about 1 hour thereafter. Strip the resultant graft copolymer latex of unreacted monomers.

Part C

Mix the graft copolymer latex of Part B with a styrene/acrylonitrile (80:20) copolymer latex in such proportions that the rubber substrate of the graft copolymer constitutes 30% of the polymer solids. Stabilize the polymer solids with an antioxidant, coagulate the mixed latices, dry and blend the dried solids with a styrene/acrylonitrile (72:28) bead copolymer in such proportions that the graft copolymer substrate constitutes 16% of the blend. Test the Izod impact strength of ½" x ½" bar of the blend at 23° C. in accordance with ASTM test D–256–47T. The Izod impact strength is shown in Table I.

EXAMPLE II

Prepare five polyblends by repeating Example I except for adding the divinylbenzene to the rubber polymerization system at the respective stages of 20% conversion (control), 45% conversion, 55% conversion, 60% conversion, and 66% conversion (control) to polymer instead of including it in the initial reaction mixture. The Izod impact strengths of the polyblends are shown in Table I.

TABLE I

| Polyblend | Percent Conversion at Divinylbenzene Add Time | Izod Impact Strength (ft. lbs./in. notch) |
| --- | --- | --- |
| A-1 | 0 | 3.3 |
| A-2 | 20 | 2.5 |
| A-3 | 45 | 4.7 |
| A-4 | 55 | 5.1 |
| A-5 | 60 | 4.5 |
| A-6 | 66 | 2.8 |

As demonstrated above, the impact strength of the polyblend can be increased by as much as 36–55% by adding the cross-linking agent at the stage of 30–60% conversion of rubber-forming monomers to polymer instead of including it in the initial reaction mixture when agitation conditions of a net horsepower of about 0.0002 HP/gallon of reaction mixture are employed for the rubber polymerization. As also demonstrated, interior results are obtained when the cross-linking agent is added prior to 30% conversion or after about 60% conversion. The following example further illustrates the undesirability of adding the cross-linking agent after the stage of about 60% conversion of rubber-forming monomers to polymer.

EXAMPLE III

Part A

Use the following polymerization recipe to prepare each of three rubber latices.

| Component: | Parts |
|---|---|
| Water | 265 |
| Butadiene | 90 |
| Styrene | 10 |
| Divinylbenzene | 0.75 |
| Sodium stearate | 5 |
| t-Dodecyl mercaptan | 0.4 |
| Potassium persulfate | 0.3 |

In each case, charge the water and sodium stearate to a suitable, agitated reaction vessel, boil to remove dissolved oxygen, and cool under nitrogen. Then add the remaining components of the polymerization recipe with the exception of divinylbenzene, and heat at about 55° C. under agitation conditions of a net horsepower of about 0.0002 HP/gallon of reaction mixture to the respective stages of 32% conversion, 60% conversion, and 85% conversion (control) to polymer. Add the divinylbenzene at these respective stages of the reactions, and continue polymerizing the monomers under the same temperature and agitation conditions until the batch pressure drops to 40 p.s.i.

Part B

Use each of the rubber latices of Part A to prepare a graft copolymer by the procedure of Example I, Part B, and prepare polyblends from these graft copolymers as in Example I, Part C. The Izod impact strengths of the polyblends are shown in Table II.

TABLE II

| Polyblend | Percent Conversion at Divinylbenzene Add Time | Izod Impact Strength (ft. lbs./in. notch) |
|---|---|---|
| B-1 | 32 | 4.4 |
| B-2 | 60 | 4.6 |
| B-3 | 85 | 1.0 |

The following examples illustrate (1) the criticality of regulating the agitation conditions during the rubber polymerization in order for the delayed addition of cross-linking agent to have the desired effect of increasing the impact strength of a polyblend prepared from the graft copolymer, and (2) the unexpectedness of this criticality in view of the absence of any substantial effect of varying the agitation conditions when the cross-linking agent is incorporated initially.

EXAMPLE IV

Part A

Use the following polymerization recipe to prepare each of five rubber latices.

| Component: | Parts |
|---|---|
| Water | 265 |
| Butadiene | 90 |
| Styrene | 10 |
| Divinylbenzene | 0.75 |
| Sodium stearate | 5 |
| t-Dodecyl mercaptan | 0.4 |
| Potassium persulfate | 0.3 |

In each case, charge the water and sodium stearate to a suitable, agitated reaction vessel, boil to remove dissolved oxygen, and cool under nitrogen. Then add the remaining components of the polymerization recipe with the exception of divinylbenzene, heat with agitation at about 55–60° C. to the stage of about 60% conversion to polymer, add the divinylbenzene, and continue polymerizing the monomers under the same temperature and agitation conditions until the batch pressure drops to 40 p.s.i. In the preparation of the five latices, employ respective agitation conditions of a net horsepower of about 0.00016 HP, 0.0002 HP, 0.0003 HP, 0.0004 HP and 0.0008 HP (control)/gallon of reaction mixture.

Part B

Use each of the rubber latices of Part A to prepare a graft copolymer by the procedure of Example I, Part B, and prepare polyblends from these graft copolymers as in Example I, Part C. The Izod impact strengths of the polyblends are shown in Table III.

TABLE III

| Polyblend | Net HP/Gallon of Reaction Mixture | Izod Impact Strength (ft. lbs./in. notch) |
|---|---|---|
| C-1 | 0.00016 | 4.4 |
| C-2 | 0.0002 | 4.6 |
| C-3 | 0.0003 | 4.1 |
| C-4 | 0.0004 | 4.2 |
| C-5 | 0.0008 | 1.8 |

EXAMPLE V (CONTROL)

Part A

Use the following polymerization recipe to prepare each of two rubber latices.

| Component: | Parts |
|---|---|
| Water | 265 |
| Butadiene | 90 |
| Styrene | 10 |
| Divinylbenzene | 0.625 |
| Sodium stearate | 5 |
| t-Dodecyl mercaptan | 0.4 |
| Potassium persulfate | 0.3 |

In each case, charge the water and sodium stearate to a suitable, agitated reaction vessel, boil to remove dissolved oxygen, and cool under nitrogen. Then add the remaining components of the polymerization recipe, and heat with agitation at 55–60° C. until the batch pressure drops to 40 p.s.i. Use respective agitation conditions of a net horsepower of about 0.0002 HP and about 0.0008 HP/gallon of reaction mixture in preparing the latices.

Part B

Use each of the rubber latices of Part A to prepare a graft copolymer by the procedure of Example I, Part B, and prepare polyblends from these graft copolymers as in Example I, Part C. The Izod impact strengths of the polyblends are shown in Table IV.

TABLE IV

| Polyblend | Net HP/Gallon of Reaction Mixture | Izod Impact Strength (ft. lbs./in. notch) |
|---|---|---|
| D-1 | 0.0002 | 4.0 |
| D-2 | 0.0008 | 3.8 |

As demonstrated in the preceding examples, the impact strength of a polyblend of (1) a graft copolymer of a mixture of styrene and acrylonitrile on a divinylbenzene-crosslinked butadiene/styrene (90:10) copolymer rubber, and (2) a rigid phase comprising two styrene/acrylonitrile copolymers is improved by delaying addition of the divinylbenzene until the stage of about 30–60% conversion of rubber-forming monomers to polymer and conducting the rubber polymerization under agitation conditions of a net horsepower of about 0.0001–0.0004 HP/gallon of reaction mixture. The improved polyblends, because of the presence of the cross-linking agent in the graft copolymer substrate, have better surface gloss than comparable polyblends having no cross-linking agent in the graft copolymer substrate. Addition of the cross-linking agent prior to 30% conversion or after 60% conversion gives anomalous results, frequently impact strengths lower than are obtained when the cross-linking agent is incorporated initially, and the use of agitation conditions more vigorous than a net horsepower of about 0.0005 HP/gallon of reaction mixture during the rubber polymerization results in a decrease in the impact strength of the polyblend. Similar results are observed in the preparation of the following polyblends:

(1) A blend of (a) a graft copolymer of 50 parts of a 50:25:25 mixture of styrene, alpha-methylstyrene, and acrylonitrile on 100 parts of a rubbery butadiene/styrene (50:50) copolymer cross-linked with 0.5% of divinylbenzene, and (b) an alpha-methylstyrene/acrylonitrile (75:25) copolymer in such proportions that the graft copolymer substrate constitutes 15% of the blend, (2) A blend of (a) a graft coplymer of 50 parts of styrene on 100 parts of a rubbery polybutadiene cross-linked with 1% of ethylene glycol dimethacrylate, and (b) polystyrene in such proportions that the graft copolymer substrate constitutes 25% of the blend, (3) A blend of (a) a graft copolymer of 55 parts of a 70:30 mixture of styrene and methyl methacrylate on 100 parts of a rubbery butadiene/styrene (90:10) copolymer cross-linked with 0.75% of divinylbenzene, and (b) a styrene/methyl methacrylate (75:25) copolymer in such proportions that the graft copolymer substrate constitutes 30% of the blend, (4) A blend of (a) a graft copolymer of 45 parts of a 70:30 mixture of styrene and acrylonitrile on 100 parts of a rubbery isoprene/styrene (90:10) copolymer cross-linked with 0.75% of divinylbenzene, and (b) a styrene/acrylonitrile (72:28) copolymer in such proportions that the graft copolymer substrate constitutes 27% of the blend, and (5) A blend of (a) a graft copolymer of 40 parts of a 72:28 mixture of styrene and acrylonitrile on 100 parts of a rubbery butadiene/styrene (90:10) copolymer cross-linked with 0.625% of divinylbenzene, and (b) polyvinyl chloride in such proportions that the graft copolymer substrate constitutes 20% of the blend.

The process of the invention is a method of preparing graft copolymers by polymerizing a monomer charge including a monovinylidene aromatic hydrocarbon in an aqueous dispersion of a preformed rubbery polymer prepared by polymerizing an aliphatic conjugated 1,3-diene, optionally together with copolymerizable monomers, in an aqueous emulsion under agitation conditions of a net horsepower of about 0.0001–0.0004 HP/gallon of reaction mixture in the presence of a cross-linking agent added to the system at a stage between about 30% and 60% conversion to polymer. With the exception of the critical features of delaying addition of the cross-linking agent until the stage of about 30–60% conversion of rubber-forming monomers to polymer and maintaining the agitation conditions of the rubber polymerization at a net horsepower of about 0.0001–0.0004 HP/gallon of reaction mixture, the process is conducted by conventional techniques already known for the preparation of graft copolymers of this type.

According to these conventional techniques, the rubber substrate of the graft copolymer is prepared by polymerizing a monomer charge comprising an aliphatic conjugated 1,3-diene in aqueous emulsion. Ordinarily, the monomer charge consists of about 50–100% by weight of an aliphatic conjugated 1,3-diene (e.g., butadiene, isoprene, piperylene, chloroprene, etc., and mixtures thereof), up to 50% by weight of a monovinylidene aromatic hydrocarbon (e.g., styrene; an ar-alkylstyrene, such as the o-, m-, and p-methylstyrenes, 2,4-dimethylstyrene, the ar-ethylstyrenes, p-t-butylstyrene, etc.; an alpha-alkylstyrene, such as alpha-methylstyrene, alpha-ethylstyrene, alpha-methyl-p-methylstyrene, etc.; vinyl naphthalene, etc., and mixtures thereof), and up to 20%, usually not more than about 10%, by weight of other copolymerizable monoethylenically unsaturated compounds (e.g., acrylonitrile; methacrylonitrile; an alkyl acrylate, such as methyl acrylate, butyl acrylate, 2-ethylhexyl acrylate, etc.; the corresponding alkyl methacrylates; a vinyl ester, such as vinyl acetate; etc., and mixtures thereof).

The monomer charge is emulsified in water with the aid of suitable micelle-forming emulsifying agents, such as fatty acid soaps, soaps of hydrogenated or dehydrogenated rosin acids, alkali metal or ammonium soaps of high molecular weight alkyl sulfates or alkaryl sulfonates, mineral acid salts of long chain aliphatic amines, etc. Particularly suitable emulsifying agents are sodium oleate, sodium palmitate, sodium stearate, and the like. The emulsifying agent is usually employed in amounts of about 2–15 parts by weight per 100 parts by weight of the monomer charge.

Polymerization is initiated by free radical initiators, e.g., hydrogen peroxide, sodium and potassium persulfates, perborates, peracetates, percarbonates, etc., which may be activated if desired to form redox systems. Polymerization is usually conducted at temperatures in the range of about 40–80° C. but may be conducted at lower temperatures in the range of about 0–40° C. in the presence of the activated initiator systems.

The polymerization recipe usually includes about 1–4 parts by weight of water per part by weight of the monomer charge, although larger amounts of water are sometimes used when greater dilution is desired. Conventional polymerization modifiers, e.g., chain-transfer agents, are optionally included, and the reaction mixture usually contains a higher alkyl mercaptan, such as t-dodecyl mercaptan, which serves the dual function of promoter and regulator.

The rubber polymerization is ordinarily continued until at least 80% of the monomer charge is converted to polymer; preferably, the reaction is carried to 90–100% conversion. After termination of this reaction, the reaction mixture may be stripped of unreacted monomers prior to the addition of the monomer charge for the grafting operation, but this stripping step is optional. The grafting operation may be performed substantially immediately after termination of the rubber polymerization reaction. Alternatively, the aqueous latex of rubbery polymer may be stored indefinitely, preferably in an inert atmosphere, before being subjected to the grafting operation.

The grafting operation is performed by polymerizing in the presence of the aqueous latex of rubbery diene polymer a monomer charge consisting essentially of 20–100% by weight of a monovinylidene aromatic hydrocarbon (e.g., styrene; an ar-alkylstyrene, such as the o-, m-, and p-methylstyrenes, 2,4-dimethylstyrene, ar-ethylstyrenes, p-t-butylstyrene, etc.; an alpha-alkylstyrene, such as alpha-methylstyrene, alpha-ethylstyrene, alpha-methyl-p-methylstyrene, etc.; vinyl naphthalene, etc., and mixtures thereof), up to 80% by weight of an acrylic compound (e.g., acrylonitrile; methacrylonitrile; a $C_1$–$C_4$ alkyl acrylate, such as methyl acrylate, butyl acrylate, etc.; a $C_1$–$C_4$ alkyl methacrylate, such as methyl methacrylate, propyl methacrylate, etc.; and mixtures thereof), and up to 20% by weight of other copolymerizable ethylenically-unsaturated compounds (e.g., a conjugated diene, such as butadiene, isoprene, etc.; an ar-halostyrene, such as the o-, m-, and p-chlorostyrenes, etc.; a dialkyl maleate or fumarate, such as the dimethyl, diethyl, dibutyl, and dioctyl maleates and fumarates, etc.; an unsaturated acid, such as acrylic acid, methacrylic, etc.; an unsaturated amide, such as acrylamide, methacrylamide, N-methyl acrylamide, N-butyl acrylamide, etc.; and mixtures thereof). The grafting monomer charge usually consists essentially of 50–100% by weight of the monovinylidene aromatic hydrocarbon, up to 50% by weight of the acrylic compound, and up to 10% by weight of other copolymerizable ethylenically-unsaturated compounds. Ordinarily, about 10–125 (preferably 30–60) parts by weight of the monomer charge are added to the aqueous latex for each 100 parts by weight of the rubber substrate. However, as already known to those skilled in the art, the ratio of the monomer charge to the rubber substrate can be varied outside these limits to alter the properties of the graft copolymers.

Polymerization of the monomer charge in the presence of the aqueous latex of rubber substrate is usually conducted with agitation in an inert atmosphere at temperatures in the range of about 40–100° C. Supplementary polymerization initiator may be added to the system together with the monomer charge to insure substantially complete conversion of the charge to polymer. However, this supplementary initiator is frequently unnecessary, particularly when substantially complete conversion is not desired. Grafting efficiency is maximized by not adding any emulsifying agent to the system after the formation of the aqueous latex of the rubber substrate, but small amounts of supplementary emulsifying agent can be added if desired. The graft copolymer formed by this operation can be isolated from the latex by conventional means, e.g., spray drying, drum drying, freeze coagulation, or chemical coagulation.

According to the present invention, these conventional techniques for preparing graft copolymers are modified by adding a cross-linking agent to the rubber polymerization system when the monomer charge is at a stage between about 30% and 60% conversion to polymer and by conducting the rubber polymerization under agitation conditions of a net horsepower of about 0.0001–0.0004 HP/gallon of reaction mixture. Ordinarily, optimum results are obtained by adding the cross-linking agent at about 50–60% conversion and using a net horsepower of 0.0001–0.0003 HP/gallon of reaction mixture.

Suitable cross-linking agents include, e.g., non-conjugated diethylenically-unsaturated compounds, such as divinylbenzene, diallyl maleate, diallyl fumarate, diallyl phthalate, dially adipate, allyl acrylate, allyl methacrylate, ethylene glycol dimethacrylate and other esters of acrylic or methacrylic acid with polyhydric alcohols, etc., as well as other polyfunctional unsaturated compounds conventionally employed as cross-linking agents. Ordinarily, the cross-linking agent is employed in concentrations of about 0.25–1.5%, preferably about 0.5–0.75%, based on the weight of the monomer charge.

This modification of conventional procedures for preparing graft copolymers results in a modification of the physical properties of the graft copolymers—particularly advantageous in that it permits the formation of graft copolymer/vinylidene resin polyblends having an improved combination of physical properties. The vinylidene resins with which the graft copolymers are blended are usually rigid polymers and copolymers of vinylidene monomers, such as styrene and other monovinylidene aromatic hydrocarbons, acrylonitrile, methacrylonitrile, vinyl chloride, methyl methacrylate, and the like. Advantageously, the vinylidene resin is one which was prepared from a monomer charge having a chemical composition similar to the grafting monomer charge. The vinylidene resin should have a specific viscosity of at least 0.05, measured as a solution of 0.1% of the polymer in dimethylformamide at 20° C. It can be blended with the graft copolymer by any suitable technique, e.g., mechanical blending of the dry polymers, co-agulation of mixed latices, etc., to form polyblends capable of being processed by extrusion, injection molding, compression molding, or other shaping operation to form strong shaped articles. Ordinarily, the amount of vinylidene resin blended with the graft copolymer is such that the graft copolymer substrate constitutes about 5–40% of the total weight of the blend.

When the comparable graft copolymers of the prior art have been associated with these vinylidene resins in polyblends, the processed articles have had the disadvantages of poor surface gloss when the rubber substrate of the graft copolymer contained no cross-linking agent and undesirably lower impact strength when the rubber substrate of the graft copolymer contained sufficient cross-linking agent to impart good surface gloss characteristics. When the graft copolymers of the invention are employed in such polyblends, the processed articles have an improved combination of surface gloss and impact strength properties.

The graft copolymers of the invention and polyblends formed therefrom may, if desired, be modified by conventional additives, such as stabilizers, antioxidants, fillers, colorants, etc.

It is obvious that many variations can be made in the products and processes set forth above without departing from the spirit and scope of this invention.

What is claimed is:

1. In a process for preparing a graft copolymer by (1) forming an aqueous dispersion of rubbery polymer by polymerizing a first monomer charge comprising an aliphatic conjugated 1,3-diene in an aqueous emulsion in the presence of a cross-linking agent, and (2) subsequently polymerizing in the presence of said aqueous dispersion of rubbery polymer a second monomer charge consisting essentially of 20–100% by weight of a monovinylidene aromatic hydrocarbon, up to 80% by weight of an acrylic compound of the group consisting of acrylonitrile, methacrylonitrile, a $C_1$–$C_4$ alkyl acrylate, a $C_1$–$C_4$ alkyl methacrylate, and mixtures thereof, and up to 20% by weight of other copolymerizable ethylenically-unsaturated compounds; the improvement which comprises conducting the polymerization of the first monomer charge in the absence of the cross-linking agent under agitation conditions of a net horsepower of about 0.0001–0.0004 HP/gallon of reaction mixture until the stage of about 30–60% conversion to polymer, then adding the cross-linking agent, and continuing the polymerization under agitation conditions of a net horsepower of about 0.0001–0.0004 HP/gallon of reaction mixture.

2. The process of claim 1 wherein the first monomer charge consists of 50–100% by weight of the aliphatic conjugated 1,3-diene, up to 50% by weight of a monovinylidene aromatic hydrocarbon, and up to 20% by weight of other copolymerizable monoethylenically-unsaturated compounds.

3. The process of claim 1 wherein the second monomer charge consists essentially of 50–100% by weight of the monovinylidene aromatic hydrocarbon, up to 50% by weight of the acrylic compound, and up to 10% by weight of other copolymerizable ethylenically-unsaturated compounds.

4. The process of claim 1 wherein the first monomer charge is polymerized in the presence of 0.25–1.5% by weight of the cross-linking agent, based on the weight of said monomer charge.

5. The process of claim 1 wherein the first monomer charge is polymerized in the presence of 0.5–0.75% by weight of the cross-linking agent, based on the weight of said monomer charge.

6. The process of claim 1 wherein 10–125 parts by weight of the second monomer charge are polymerized in the presence of an aqueous dispersion of 100 parts by weight of the rubbery polymer.

7. The process of claim 1 wherein the polymerization of the first monomer charge is conducted under agitation conditions of a net horsepower of about 0.0001–0.0003 HP/gallon of reaction mixture.

7. The process of claim 1 wherein the polymerization of the first monomer charge is conducted in the absence of the cross-linking agent until the stage of about 50–60% conversion to polymer.

9. In a process for preparing a graft copolymer by (1) forming an aqueous dispersion of rubbery polymer by polymerizing a first monomer charge consisting of 50–100% by weight of butadiene, up to 50% by weight of a monovinylidene aromatic hydrocarbon, and up to 20% by weight of other copolymerizable ethylenically-unsaturated compounds in the presence of 0.5–0.75% by weight of divinylbenzene, based on the weight of the monomer charge, and (2) subsequently polymerizing in the presence of said aqueous dispersion of rubbery polymer a second monomer charge consisting essentially of 50–100% by weight of a monovinylidene aromatic hydrocarbon, up to 50% by weight of an acrylic compound of the group consisting of acrylonitrile, methacrylonitrile, a $C_1$–$C_4$ alkyl acrylate, a $C_1$–$C_4$ alkyl methacrylate, and mixtures thereof, and up to 20% by weight of other copolymerizable ethylenically-unsaturated compounds; the improvement which comprises conducting the polymerization of the first monomer charge in the absence of the divinylbenzene under agitation conditions of a net horsepower of about 0.0001–0.0003 HP/gallon of reaction mixture until the stage of about 50–60% conversion to polymer, then adding the divinylbenzene, and continuing the polymerization under agitation conditions of a net horsepower of about 0.0001–0.0003 HP/gallon of reaction mixture.

References Cited

UNITED STATES PATENTS

| | | | |
|---|---|---|---|
| 2,847,406 | 8/1958 | Legge | 260—83.7 |
| 3,222,422 | 12/1965 | Cohen | 260—880 |

MURRAY TILLMAN, *Primary Examiner.*

D. J. BREZNER, *Assistant Examiner.*